United States Patent
Tsutsui et al.

(10) Patent No.: US 6,985,428 B2
(45) Date of Patent: *Jan. 10, 2006

(54) OPTICAL RECORDING MEDIUM, RECORDING, AND REPRODUCTION APPARATUS HAVING MULTIPLE RECORDING CAPACITY FEATURES

(75) Inventors: Keiichi Tsutsui, Kanagawa (JP); Atsushi Fukumoto, Kanagawa (JP); Masayuki Arai, Tokyo (JP); Katsuhisa Aratani, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,533

(22) Filed: Mar. 24, 2005

(65) Prior Publication Data

US 2005/0163031 A1    Jul. 28, 2005

Related U.S. Application Data

(63) Continuation of application No. 09/730,344, filed on Dec. 5, 2000, now Pat. No. 6,885,628.

(30) Foreign Application Priority Data

Dec. 24, 1999    (JP)    ................................ P11-368398

(51) Int. Cl.
*G11B 7/24*    (2006.01)
(52) U.S. Cl. ............... 369/275.3; 369/275.4; 369/13.47
(58) Field of Classification Search ............ 369/275.3, 369/275.4, 275.1, 278, 279, 44.26, 53.2, 369/53.44, 53.35, 53.11, 13.34, 13.47, 53.15, 369/47.52, 47.54, 13.06, 13.08
See application file for complete search history.

(56) References Cited

U.S. PATENT DOCUMENTS

| | | | |
|---|---|---|---|
| 6,298,033 B1 | 10/2001 | Tanoue et al. | |
| 6,747,934 B2 * | 6/2004 | Ichikawa et al. | ........ 369/53.35 |
| 6,747,942 B1 * | 6/2004 | Tanoue et al. | .......... 369/275.3 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

A recording and reproduction apparatus using a plurality of generations of optical recording media and an optical recording medium used in such a recording and reproduction apparatus, wherein the optical recording medium comprises first and second recording areas, the first recording area is divided into a plurality of zones, each of the plurality of zones is divided into a plurality of divided areas of one type among a plurality of types set in advance, the plurality of divided areas are assigned addresses and have fixed recording capacities, and identification information indicating the one type is recorded in the second recording area. The apparatus focuses a laser beam on the second recording area to read the identification information and records information on the first recording area or detects recorded information of the first recording area based on the identification information. The optical recording medium is for example a magneto-optical disk.

1 Claim, 12 Drawing Sheets

TYPE 1
(Q GENERATION)

TYPE 2
(Q+1 GENERATION)

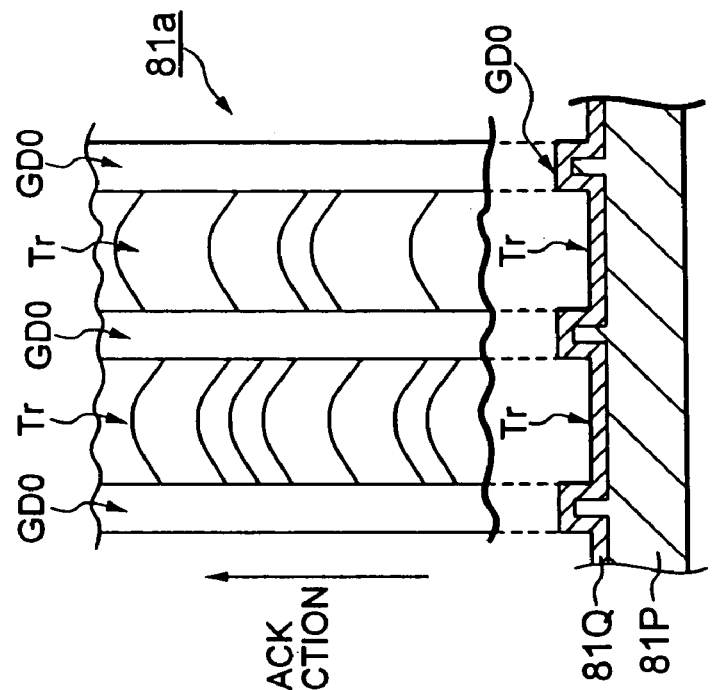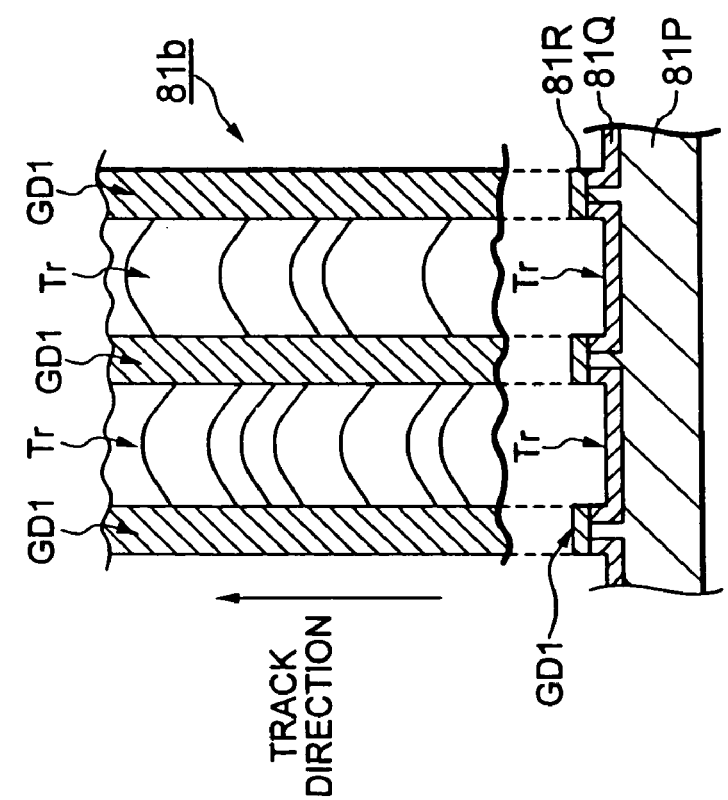

FIG. 8

| ZONE | DIAMETER (mm) | NUMBER OF SECTOR ADDRESSES / TRACK | | NUMBER OF TRACKS |
|---|---|---|---|---|
| | | TYPE 1 | TYPE 2 | |
| No.1 | 22.6~25.4 | 20 | 25 | 4000 |
| No.2 | 25.4~28.2 | 22 | 27 | 4000 |
| No.3 | 28.2~31.0 | 24 | 30 | 4000 |
| ... | — | — | — | — |

FIG. 9

| ZONE | DIAMETER (mm) | NUMBER OF SECTOR ADDRESS / TRACK | CAPACITY / SECTOR ADDRESS (kB) | | NUMBER OF TRACKS |
|---|---|---|---|---|---|
| | | | TYPE 1 | TYPE 2 | |
| No.1 | 22.6~25.4 | 25 | 4 | 5 | 4000 |
| No.2 | 25.4~28.2 | 27 | 4 | 5 | 4000 |
| No.3 | 28.2~31.0 | 29 | 4 | 5 | 4000 |
| ... | — | — | — | — | — |

OPTICAL RECORDING MEDIUM, RECORDING, AND REPRODUCTION APPARATUS HAVING MULTIPLE RECORDING CAPACITY FEATURES

CROSS REFERENCE TO RELATED APPLICATION

This application is one of two continuation applications of Ser. No. 09/730,344, filed Dec. 5, 2000 now U.S. Pat. No. 6,885,628, the entire contents being incorporated herein by reference.

BACKGROUND OF THE INVENTION

1. Field of the Invention

The present invention relates to an optical recording medium such as an optical disk and to a recording and reproduction apparatus for recording information on an optical recording medium and detecting recorded information on an optical recording medium.

2. Description of the Related Art

In recent years, the recording densities of optical disks have been improved. Further, their formats, which determine the recording and reproduction systems, have been changed.

For example, in a 90 mm size magneto-optical disk (MO disk) of the International Organization for Standardization (ISO) standard, the first generation capacity was 128 MB, the second generation capacity 230 MB, and the third generation capacity 640 MB. The recording capacity has improved with each generation.

Similarly, in a 130 mm size magneto-optical disk, the first generation capacity was 650 MB, the second generation capacity 1.3 GB, and the third generation capacity 2.0 GB. Again, the recording capacity has improved with each generation.

The size of a beam spot of a laser beam focused on an optical disk is determined by optical parameters such as the wavelength $\lambda$ of the laser beam used and the numerical aperture NA of the object lens, so the format of an optical disk is closely related with the optical parameters.

In the format of optical disks in the related art, the optical parameters have been changed along with each generation to enable recording and reproduction of finer marks using a smaller beam spot.

Also, the modulation and demodulation methods, addressing method, method of division of recording regions, etc. have been changed so as to be suited for the finer marks. For example, the zone format, the number of addresses in a zone, the recording capacity of an address, modulation method, demodulation method, etc. have been changed with every generation. As a result, the recording capacity of optical disks has been improved along with each generation.

Recording and reproduction apparatuses for third generation optical disks are designed based on these changes in first and second generation formats so as to be able to handle first, second, and third generation optical disks.

Summarizing the problem to be solved by the invention, generally, however, recording and reproduction apparatus designed for first generation optical disks cannot handle second and third generation optical disks. This is because in the first generation, it was difficult to predict the modulation and demodulation methods, addressing methods, etc. of the following generations.

SUMMARY OF THE INVENTION

An object of the present invention is to provide a recording and reproduction apparatus capable of using a plurality of generations of optical media.

Another object of the present invention is to provide an optical recording medium able to be used in such a recording and reproduction apparatus.

According to a first aspect of the present invention, there is provided an optical recording medium comprising first and second recording areas, wherein the first recording area being divided into a plurality of zones; each of the plurality of zones being divided into a plurality of divided areas of one type among a plurality of N number of types (N is an integer more than 1) set in advance; the plurality of divided areas included in each of the plurality of zones being assigned addresses and having fixed recording capacities; and identification information indicating the one type being recorded in the second recording area.

Preferably, the medium comprises a magneto-optical disk and at least one of the first and second recording areas comprises an area in which information is recorded by a magnetic field modulation recording system and recorded information is reproduced by a reproduction system using a domain wall displacement phenomenon or a super resolution phenomenon.

Preferably the second recording area is further recorded with conditional information indicating at least one of recording conditions and reproduction conditions.

Alternatively, preferably the medium comprises an optical disk; the first recording area is an area positioned between a read-in area and a read-out area in the information area; and the second recording area comprises at least one of the read-in area and the read-out area.

According to a second aspect of the present invention, there is provided an optical recording medium comprising first and second recording areas, wherein the first recording area is divided into a plurality of zones; each of the plurality of zones is divided into a fixed plurality of divided areas; the plurality of divided areas included in each of the plurality of zones have one type of recording capacity among recording capacities of M number of types (M is an integer more than 1) set in advance and are assigned addresses; and identification information indicating the one type is recorded in the second recording area.

Preferably, the medium comprises a magneto-optical disk and at least one of the first and second recording areas comprises an area in which information is recorded by a magnetic field modulation recording system and recorded information is reproduced by a reproduction system using a domain wall displacement phenomenon or a super resolution phenomenon.

Preferably, the second recording area is further recorded with conditional information indicating at least one of recording conditions and reproduction conditions.

Alternatively, preferably the medium comprises an optical disk; the first recording area comprises an area positioned between a read-in area and a read-out area in the information area; and the second recording area comprises at least one of the read-in area and the read-out area.

According to a third aspect of the present invention, there is provided a recording and reproduction apparatus focusing a laser beam on an optical recording medium to record information on the optical recording medium and detect recorded information of the optical recording medium, wherein the optical recording medium has first and second recording areas, wherein the first recording area is divided into a plurality of zones, each of the plurality of zones is divided into a plurality of divided areas of one type among a plurality of N number of types (N is an integer more than 1) set in advance, the plurality of divided areas included in each of the plurality of zones are assigned addresses and have a fixed recording capacity, and identification information indicating the one type is recorded in the second recording area; and the apparatus focuses the laser beam on the second recording area to read the identification information and records information on the first recording area and detects recorded information of the first recording area based on the read identification information.

Preferably, the optical recording medium comprises a magneto-optical disk; and at least one of the first and second recording areas comprises an area in which information is recorded by a magnetic field modulation recording system and recorded information is reproduced by a reproduction method using a domain wall displacement phenomenon or super resolution phenomenon.

Preferably, the second recording area is further recorded with conditional information indicating at least one of recording conditions and reproduction conditions; and the apparatus focuses the laser beam on the second recording area to read the identification information and conditional information and focuses a laser beam in accordance with the read identification information on the first recording area to record information or detect recorded information of the first recording area.

Alternatively, preferably the optical recording medium comprises an optical disk; the first recording area comprises an area positioned between a read-in area and a read-out area in the information area; and the second recording area comprises at least one of the read-in area and the read-out area.

According to a fourth aspect of the present invention, there is provided a recording and reproduction apparatus focusing a laser beam on an optical recording medium to record information on the optical recording medium and detect recorded information of the optical recording medium, wherein the optical recording medium has first and second recording areas, wherein the first recording area is divided into a plurality of zones, each of the plurality of zones is divided into a fixed plurality of divided areas, the plurality of divided areas included in each of the plurality of zones have one type of recording capacity among recording capacities of M number of types (M is an integer more than 1) set in advance and are assigned addresses, and identification information indicating the one type is recorded in the second recording area; and the apparatus focuses the second recording area on the second recording area to read the identification information and records information on the first recording area and detects recorded information of the first recording area based on the read identification information.

Preferably, the optical recording medium comprises a magneto-optical disk; and at least one of the first and second recording area comprises an area in which information is recorded by a magnetic field modulation recording system and recorded information is reproduced by a reproduction system using a domain wall displacement phenomenon or super resolution phenomenon.

Preferably, the second recording area is further recorded with conditional information indicating at least one of recording conditions and reproduction conditions; and the apparatus focuses the laser beam on the second recording area to read the identification information and conditional information and focuses a laser beam in accordance with the read identification information on the first recording area to record information on the first recording area and detect recorded information of the first recording area.

Alternatively, the optical recording medium comprises an optical disk; the first recording area comprises an area positioned between a read-in area and a read-out area in the information area; and the second recording area is at least one of the read-in area and the read-out area.

That is, in the above first optical recording medium, since each of the plurality of zones included in the first recording area is divided into a plurality of divided areas of one type among a plurality of N number of types, each of the plurality of divided areas is assigned an address, and each has a fixed recording capacity, the recording density and/or recording capacity can be improved by selecting a type having larger divided areas from the N number of types.

In the first recording and reproduction apparatus, by focusing a laser beam on the second recording area of the first optical recording medium to read identification information of the above one type and recording information or detecting recorded information in the first recording area based on the read identification information, it is possible to use optical recording media of a plurality of generations having different recording densities and/or recording capacities.

In the above second optical recording medium, since each of the plurality of zones included in the first recording area is divided into a fixed plurality of divided areas, each of the plurality of divided areas has a recording capacity of one type among the recording capacities of M number of types, and each is assigned an address, the recording density and/or recording capacity can be improved by selecting a type having larger divided areas from the M number of types.

In the second recording and reproduction apparatus, by focusing a laser beam on the second recording area on the second optical recording medium to read identification information of the above one type and recording information or detecting recorded information in the first recording area based on the read identification information, it is possible to use optical recording media of a plurality of generations having different recording densities and/or recording capacities.

BRIEF DESCRIPTION OF THE DRAWINGS

These and other objects and features of the present invention will become clearer from the following description of the preferred embodiments given with reference to the accompanying drawings, in which:

FIGS. 6A to 6D are views for explaining the difference between two types of magneto-optical disks;

FIG. 8 is a view for explaining a data table defining numbers of addresses in a zone by type;

FIG. 9 is a view for explaining a data table defining recording capacities of divided areas corresponding to addresses in a zone by type;

DESCRIPTION OF THE PREFERRED EMBODIMENTS

Below, preferred embodiments will be described with reference to the accompanying drawings.

Figure 1:
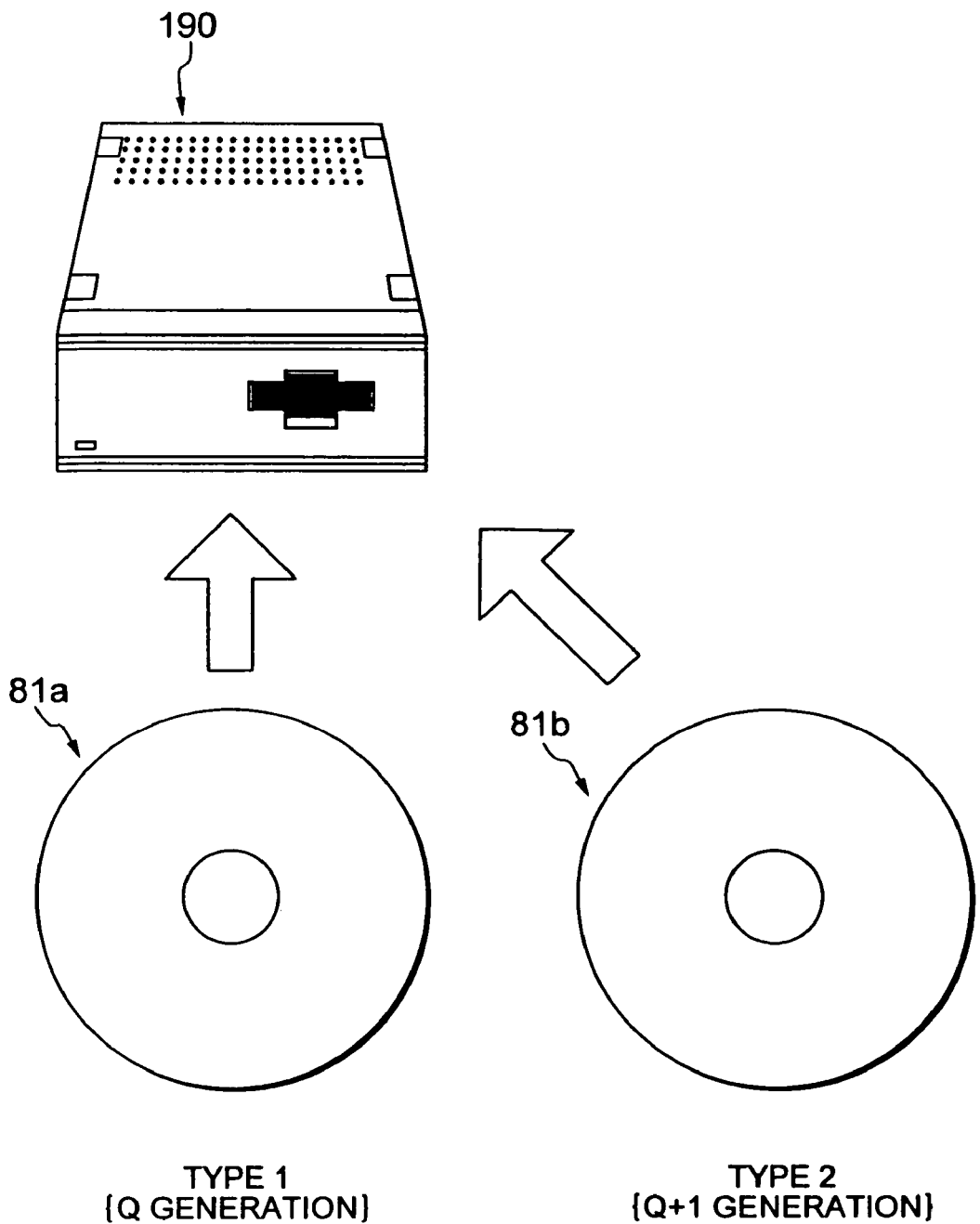
FIG. 1 is a schematic explanatory view of the relationship of a recording and reproduction apparatus and an optical disk according to the present invention.

FIG. 1 is a schematic view for explaining the relationship between a recording and reproduction apparatus and an optical disk according to the present invention.

The recording and reproduction apparatus 190 comprises an optical system which records information on an optical recording medium and detects recorded information on the optical recording medium by focusing a laser beam on an optical disk 81a or 81b.

The recording and reproduction apparatus 190 can use a Q-generation optical disk 81a of type 1 and a (Q+1) generation optical disk Bib of type 2, where Q is a natural number. The optical disks 81a and 81b are improved in recording capacity in the order of type 1 and type 2.

The optical disks 81a and 81b have substantially the same external form, track shape, and address shape and have servo signals, address signals, and reproduction signals which can be detected by using the optical system. The optical disks 81a and 81b may also be inserted into cartridges and the cartridges mounted in the recording and reproduction apparatus 190.

Next, the principle of improvement of the recording capacity of an optical disk with the same optical parameters will be explained as an example. As an optical disk, a magneto-optical disk is used as an example.

The magnetic field modulation recording system is a recording system capable of recording marks smaller than a size of a beam spot of a laser beam on a recording layer of a magneto-optical disk.

Figure 2:
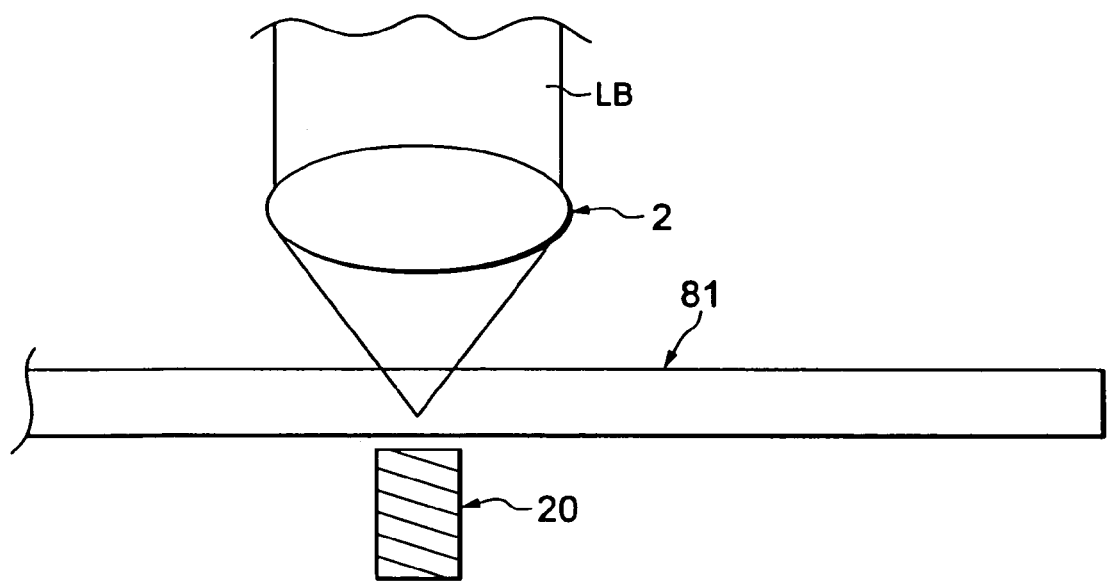
FIG. 2 is a view for explaining a magnetic field modulation recording system.
Figure 3:
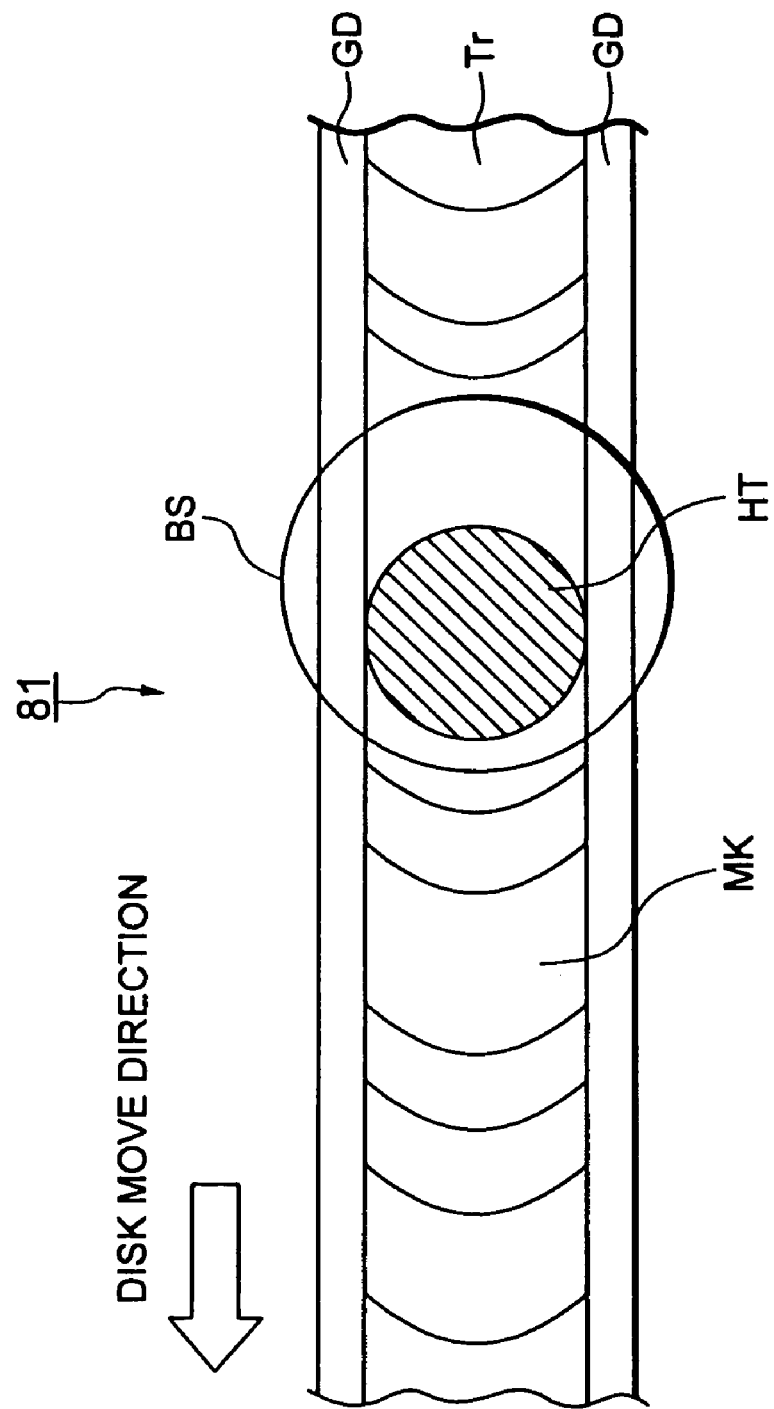
FIG. 3 is an explanatory view of how a record mark is formed on a magneto-optical disk by the magnetic field modulation recording system.

FIGS. 2 and 3 are views for explaining the magnetic field modulation recording system.

In FIG. 2, an object lens 2 and a magnetic head 20 are arranged facing to each other across a magneto-optical disk 81.

At the time of recording, a record mark is formed by forming a beam spot of a laser beam LB on the recording layer in the magneto-optical disk 81 by the object lens 2 and alternating the direction of the magnetic field of the magnetic line of force generated by the magnetic head 20.

FIG. 3 is a view of how a record mark is formed on the magneto-optical disk 81 by the magnetic field modulation system.

The recording layer of the magneto-optical disk 81 is formed with a track Tr and guides GD of the track Tr. A beam spot BS of the laser beam LB is focused on the recording layer. The center of the beam spot is positioned at the center portion of the track Tr. For example, the track Tr may be made a groove and the guides GD made lands. Alternatively, the track Tr may be made a land and the guides GD made grooves.

A high temperature portion HT of the beam spot BS is a region exceeding the Curie temperature of the recording layer. Outside the high temperature portion HT, the temperature becomes lower than the Curie temperature. The high temperature portion HT is magnetized by an external magnetic field from the magnetic head 20. A record mark MK becomes a chevron shape or a crescent shape corresponding to the temperature gradient formed by the high temperature portion HT of the beam spot BS.

Accordingly, by alternating the external magnetic field, as illustrated, record marks MK smaller than the beam spot BS can be successively formed in the track direction.

In this way, by using the magnetic field modulation recording system, recording at a higher density becomes possible without making the beam spot BS smaller.

Next, an example of a reproduction system capable of reproducing information recorded at a high density without making the beam spot smaller will be explained.

Japanese Unexamined Patent Publication (Kokai) No. 6-290496 discloses such a magneto-optical reproduction method.

In this magneto-optical reproduction method, the magneto-optical disk comprises at least a three-layer magnetic film including a displacement layer, switching layer, and memory layer. When reproducing a signal, the size of the recorded magnetic domain is substantially enlarged to increase the reproduction carrier signal by using domain wall displacement of the displacement layer in a region where the temperature of the magnetic layer becomes equal to or higher than the Curie temperature of the switching layer.

This reproduction system using domain wall displacement is called domain wall displacement detection (DWDD). This reproduction system will be explained with reference to FIGS. 4A and 4B.

Figure 4:
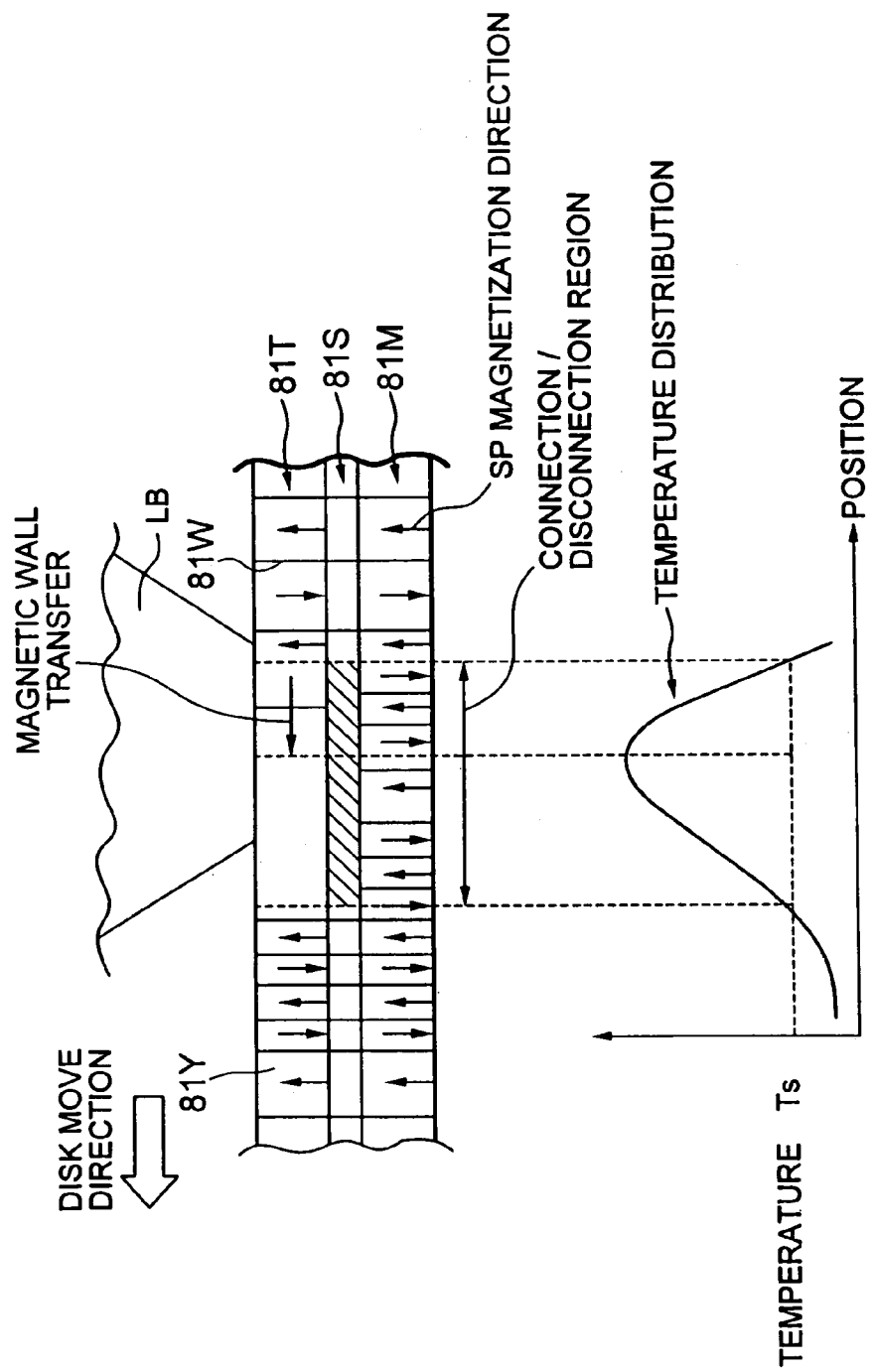
FIGS. 4A and 4B are views for explaining an example of a reproduction system using domain wall displacement.

FIG. 4A is a view of how a laser beam LB is focused on a displacement layer 81T, switching layer 81S, and memory layer 81M. Note that the three-layer magnetic film comprised of the displacement layer 81T, switching layer 81S, and memory layer 81M corresponds to a recording layer.

The memory layer 81M is recorded with a signal (or information) in accordance with the length of the magnetic domain Y having a spin polarization SP (magnetization direction). The interface between adjacent magnetic domains 81Y is a domain wall 81W.

During signal reproduction, when the recording layer is locally heated by the laser beam LB, a temperature gradient as shown in FIG. 4B is formed.

In the switching layer 81S, a region where the temperature is higher than the Curie temperature of the switching layer 81S is demagnetized and cut in exchange coupling with the memory layer 81M. Further, only the domain wall 81W in the displacement layer 81T having a small domain wall magneto restrictive force displaces to the high temperature side.

Every time a domain wall 81W, formed at intervals in accordance with a signal recorded on the memory layer 81M, reaches an isotherm of the Curie temperature along with rotation of the magneto-optical disk 81, domain wall displacement occurs in the displacement layer 81T and spin polarization SP of the magnetic domain 81Y enlarged by the domain wall displacement is detected, whereby a recording signal can be detected.

The DWDD system has the advantage that a large signal can be taken out from fine recording magnetic domains 81Y having a smaller period than a limit of optical resolution of the laser beam LB and therefore information recorded at a high density can be detected without changing optical parameters such as the wavelength λ of the laser beam and numerical aperture NA of the object lens.

In the magneto-optical reproduction system, as a system using the above magnetic domain enlarging phenomenon, there is the system of enlarging the recording magnetic domains by a reproduction magnetic field from the outside (magnetic amplifying magneto-optical system, so-called MAMMOS). Further, there is a super resolution system using the high temperature portion at the center of the beam spot (so-called "center aperture detection" (CAD) in magnetically induced super resolution (MSR)). These are capable of attaining a high density without changing the optical parameters, so are promising systems for further increasing the recording density.

Figure 5:
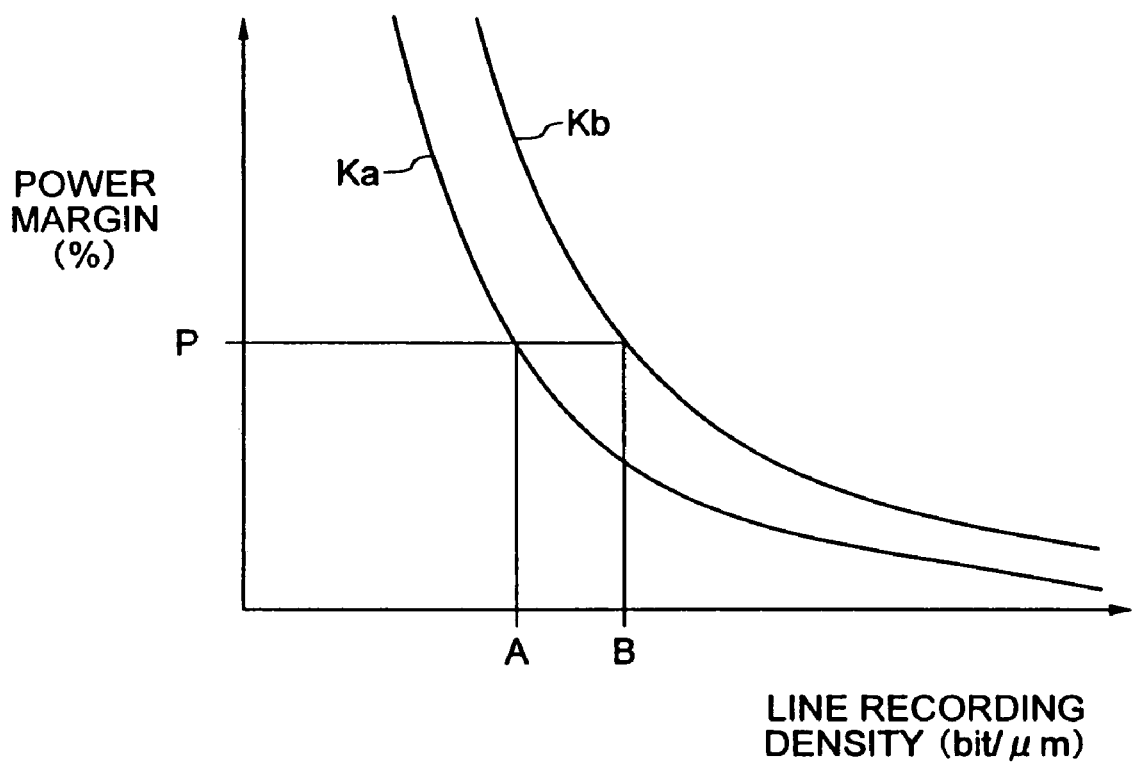
FIG. 5 is a graph of the characteristics of two types of magneto-optical disks for recording a signal by the magnetic field modulation recording system and for reproducing a signal by a reproduction system using domain wall displacement.

FIG. 5 is a graph of the characteristics of two types of magneto-optical disks for recording a signal by the magnetic field modulation recording system and reproducing the signal by the DWDD system. Here, the case where the optical disks 81a and 81b are magneto-optical disks and have the illustrated characteristic curves Ka and Kb will be explained as an example.

In FIG. 5, the abscissa indicates a linear recording density, while the ordinate indicates a power margin of a laser beam at the time of recording and reproduction.

The linear recording density indicates a limit density capable of securing a predetermined error rate. The track pitches are the same, and the changes in the recording density are formed by changes of recording density in the track direction.

On the other hand, the power margin indicates the range of fluctuation of the laser power enabling normal recording and reproduction. The larger the power margin is, the greater the resistance to temperature changes and aging and the more possible it is to deal with manufacturing variations in magneto-optical disks and recording and reproduction apparatuses.

The power margin also arises due to dispersion of a beam spot caused by poor focusing and inclination of the laser beam and has a bearing on the degree of allowance of such fluctuations.

In the chart of FIG. 5, the characteristics curves Ka and Kb of the magneto-optical disks 81a and 81b indicate that the higher the recording density, the less the power margin. Also, under the same power margin, the magneto-optical disk 81b can give a higher recording density compared with the magneto-optical disk 81a.

In the recording and reproduction apparatus 190, generally a certain power margin has to be secured. For example, when a power margin P is required, the recording density B becomes the limit in the magneto-optical disk 81b and the recording density A becomes the limit in the magneto-optical disk 81a.

FIGS. 6A to 6D are views for explaining the difference between the magneto-optical disks 81a and 81b.

FIG. 6A is an enlarged view for explaining a track of the magneto-optical disk 81b, while FIG. 6B is an enlarged view for explaining the magneto-optical disk 81b.

FIG. 6C is an enlarged view for explaining a track of the magneto-optical disk 81a, while FIG. 6D is an enlarged view for explaining the magneto-optical disk 81a.

In the magneto-optical disks 81a and 81b shown in FIGS. 6A to 6D,.a recording layer 81Q is formed on a disk substrate 81P. Lands and grooves are formed by the topology of the recording layer 81Q. The grooves correspond to the tracks Tr, while the lands correspond to the guides GD0 and GD1.

The magneto-optical disk 81b shown in FIGS. 6A and 6B is formed by firing a laser beam having a short wavelength at a high power on the guide GD0 of a track interface of the magneto-optical disk 81a shown in FIGS. 6C and 6D to convert it to the guide GD1 and burning apart the recording layer of the track interface of the magneto-optical disk 81a to form a cut region 81R. By adopting this configuration, the magnetic connection between adjacent tracks is cut and displacement of the domain walls becomes smooth, so fine marks (or a signal) can be reproduced stably.

Note that the magneto-optical disk 81b becomes higher in cost compared with the magneto-optical disk 81a since the lands are burnt apart by a high power laser beam.

As another method for improving the recording density, there is the method of irradiating a track with ultraviolet rays for annealing it before recording the signal. The annealing can make the displacement of the domain walls smooth. Note that this method is also higher in cost compared with an magneto-optical disk which is not annealed since it is annealed by ultraviolet rays.

In view of the balance of costs and the recording density, it is preferable to be able to record and reproduce on and from at least two types of magneto-optical disks. In the present embodiment, the format of the magneto-optical disk is defined as indicated below anticipating an improvement of the recording density.

Figure 7:
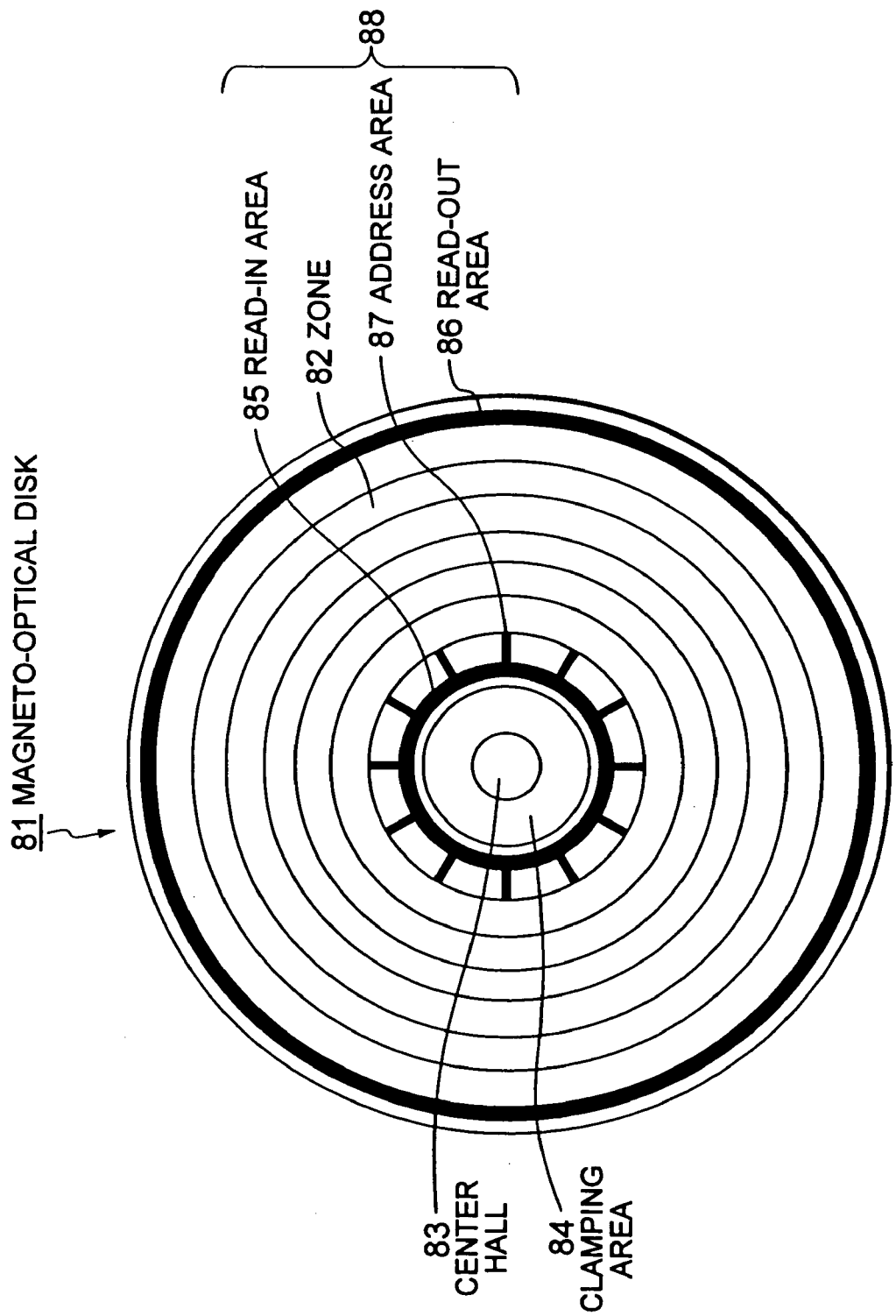
FIG. 7 is a view for explaining the structure of the format of an optical disk according to the present invention.

FIG. 7 is a view for explaining the structure of the format of an optical disk according to the present invention. The explanation will be given describing the above magneto-optical disks 81a and 81b given as examples of optical disks as the magneto-optical disk 81.

The magneto-optical disk 81 is formed with a center hole 83. A clamping area 84 is used for holding the magneto-optical disk 81 on a turntable in the recording and reproduction apparatus 190.

The magneto-optical disk 81 comprises an information area 88. The information area 88 is comprised of a first and second recording areas.

The first recording area is positioned between a read-in area 85 and a read-out area 86, is divided into a plurality of zones 82, and records a variety of information.

Each of the plurality of zones 82 is, as an example, divided to a plurality of divided areas of one type among a plurality of a predetermined N number of types (N is an integer more than 1). Also, each of the plurality of divided areas included in the respective zones is assigned an address and has a fixed recording capacity.

Note that in the explanatory view of FIG. 7, 12 address areas 87 positioned in the inner-most zone are shown as an example, and the address areas in other zones are omitted.

The second recording area comprises a read-in area 85 on an inner circumference side and a read-out area 86 on an outer circumference side, records identification information showing the one type, and records information indicating the difference of the recording density from the first recording area.

The magneto-optical disk 81 mounted on the turntable of the recording and reproduction apparatus 190 is made to rotate at a predetermined rotational speed (for example, a constant linear velocity) in accordance with the area or zone 82 on which the beam spot BS is focused.

An address signal of the address area 87 is composed of topological marks called "emboss pits". The recording and reproduction positions of a signal are set in accordance with the address. Note that the divided area corresponding to an address area 87 may also be made a sector.

In the magneto-optical disk 81, the difference of the recording density is defined by the identification information of the type. The recording capacity of the zones 82 is changed in accordance with the identification information.

A first method of changing the recording capacity of the zones 82 is to make the recording capacities of the divided areas (for example sectors) constant and to define the number of addresses in the zones by type.

FIG. 8 illustrates the first method and is an explanatory view of a data table defining the number of addresses in zones by type. The zone positioned at the inner-most circumference is designated zone no. 1, while the zones outward from there are designated zone no. 2, zone no. 3, etc. The radial position of each zone and the number of sector addresses per track (one turn of the track) are defined by type.

Zone no. 1 is positioned at a radius of 22.6 mm to 25.4 mm, has 4000 tracks, and has 20 addresses per track in type 1 and 25 in type 2.

Zone no. 2 is positioned at a radius of 25.4 mm to 28.2 mm, has 4000 tracks, and has 22 addresses per track in type 1 and 27 in type 2.

Zone no. 3 is positioned at a radius of 28.2 mm to 31.0 mm, has 4000 tracks, and has 24 addresses per track in type 1 and 30 in type 2.

The recording density can be improved in the order of type 1 and type 2 in this way.

A second method of changing the recording capacity of the zones 82 is to make the number of addresses constant in the zones and to define the recording capacity of divided areas corresponding to the addresses (recording capacity per address) by type.

FIG. 9 illustrates the second method and is an explanatory view of a data table defining the recording capacity of the divided areas corresponding to addresses in the zones. The zone positioned at the inner-most circumference is designated zone no. 1, while the zones outward from there are designated zone no. 2, zone no. 3, etc. The radial position of each zone and the number of sector addresses per track are defined by type.

Zone no. 1 is positioned at a radius of 22.6 mm to 25.4 mm, has 4000 tracks, and has 25 addresses per track. The recording capacity per address is 4 kB in type 1 and 5 kB in type 2.

Zone no. 2 is positioned at a radius of 25.4 mm to 28.2 mm, has 4000 tracks, and has 27 addresses per track. The recording capacity per address is 4 kB in type 1 and 5 kB in type 2.

Zone no. 3 is positioned at a radius of 28.2 mm to 31.0 mm, has 4000 tracks, and has 29 addresses per track. The recording capacity per address is 4 kB in type 1 and 5 kB in type 2.

The recording density can be improved in the order of type 1 and type 2 in this way.

The recording and reproduction apparatus 190 for the above recording format first detects the identification information in the read-in area or read-out area before recording and reproducing the signal. At the time of recording and reproduction, it accesses a desired sector address-by referring to the above data table, obtaining a position of an aimed zone in accordance with the detected type, and reading an address signal of emboss pits.

Also, the recording and reproduction apparatus 190 can store a predetermined data table in an internal memory in a control circuit for reference as needed.

To secure the interchangeability of the different types of magneto-optical disks 81 (magneto-optical disks 81a and 81b), conditional information indicating the recording conditions and/or reproduction conditions of the magneto-optical disk 81 may be recorded in the second recording area of the magneto-optical disk 81. The recording conditions are, for example, the laser power, duty factor of the laser beam LB, intensity of the recording magnetic field, etc.

In the magneto-optical disk 81, by using the magnetic field modulation recording system and a reproduction system using the magnetic domain enlarging phenomenon or super resolution phenomenon, the recording density can be increased without changing optical parameters. Further, a recording and reproduction apparatus for current generation magneto-optical disks can handle next generation magneto-optical disks having an increased recording capacity.

Figure 10:
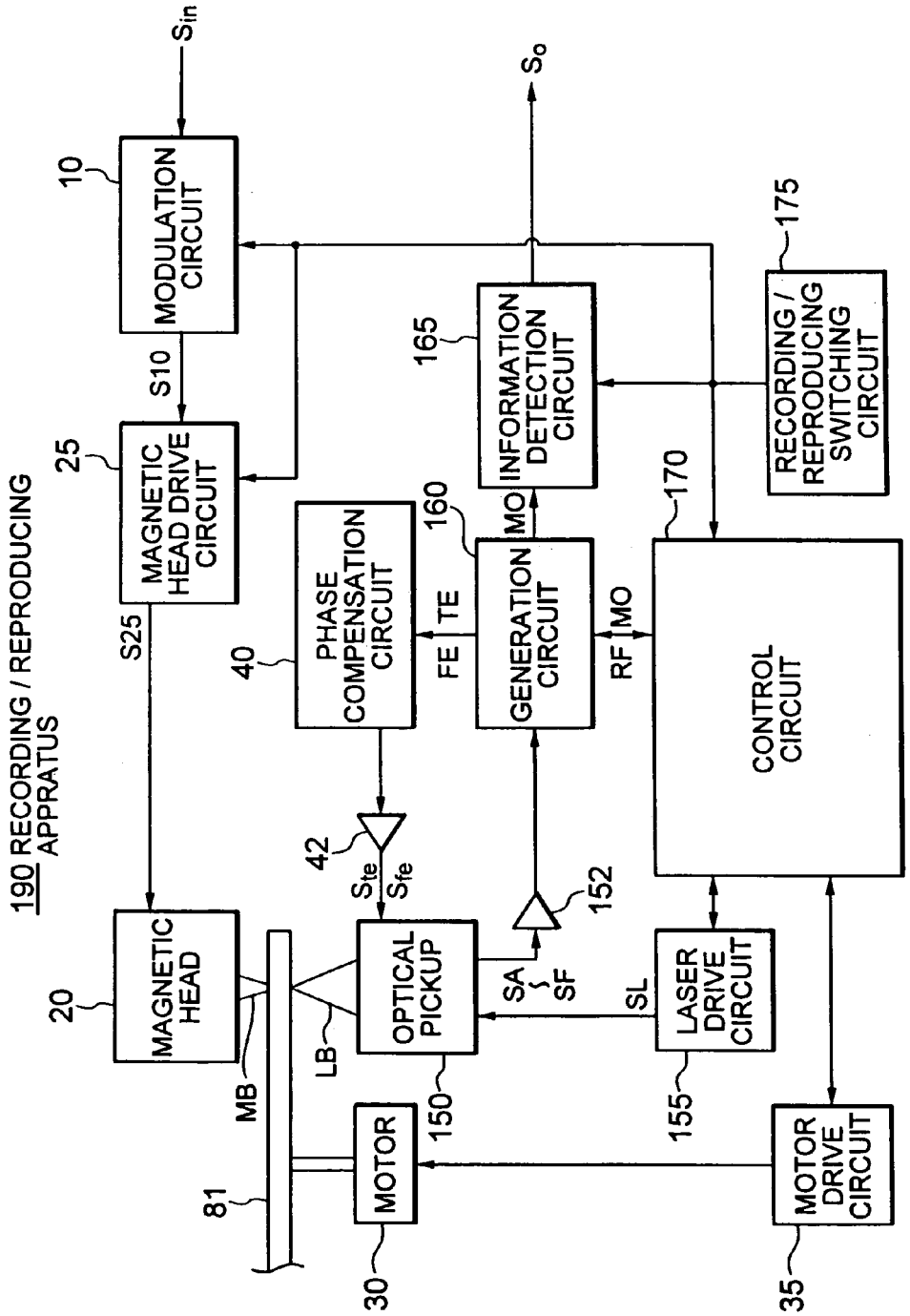
FIG. 10 is a schematic view of the block configuration of a recording and reproduction apparatus according to an embodiment of the present invention.

FIG. 10 is a schematic view of the configuration of a recording/recording apparatus according to an embodiment of the present invention.

The recording and reproduction apparatus 190 focuses the laser beam LB on the second recording area of the magneto-optical disk 81 to read the identification information and the conditional information, focuses the laser beam LB in accordance with the read conditional information on the first recording area to record information on the first recording area, or focuses the laser beam in accordance with the conditional information on the first recording area to detect recorded information in the first recording area.

The recording and reproduction apparatus 190 comprises a modulation circuit 10, a magnetic head 20, a magnetic head drive circuit 25, a motor 30, a motor drive circuit 35, a phase compensation circuit 40, an amplifying circuit 42, an optical pickup 150, an amplifying circuit (head amplifier) 152, a laser drive circuit 155, a generation circuit 160, an information detection circuit 165, a control circuit 170, and a recording/reproduction switching circuit 175.

The recording and reproduction apparatus 190 records information on the rotating magneto-optical disk 81 or detects recorded information from the rotating magneto-optical disk 81.

The control circuit 170 is a controller for controlling the recording and reproduction apparatus 190 as a whole and is comprised for example by a microcomputer.

The control circuit 170 controls the motor drive circuit 35, the laser drive circuit 155, the optical pickup 150, the phase compensation circuit 40, the generation circuit 160, the information detection circuit 165, the magnetic head drive circuit 25, the modulation circuit 10, etc. Also, the control circuit 170 comprises an internal memory storing the data tables shown in FIGS. 8 and 9.

The optical pickup 150 focuses the laser beam LB on a recording position of the magneto-optical disk 91 at the time of recording and focuses the laser beam LB on the reproducing position of the magneto-optical disk 81 at the time of reproduction. Note that the-power of the laser beam LB is larger at recording than reproduction.

The modulation circuit 10 receives as input an input signal Sin indicating information to be recorded at recording, modulates the input signal Sin by eight-to-fourteen modulation (EFM) etc. to generate an output signal S10, and supplies the output signal S10 to the magnetic head drive circuit 25.

The magnetic head drive circuit 25 supplies an excitation current S25 for driving use to the magnetic head 20 based on the output signal S10 of the modulation circuit 10.

The magnetic head 20 is excited at its core by the excitation current S25 from the magnetic head drive circuit 25, generates a magnetic line of force MB in accordance with the input signal Sin from the core, and applies a magnetic field in accordance with the input signal Sin to the portion of the magneto-optical disk 81 where the beam is focused.

The motor 30 is for example comprised of a spindle motor and rotates the magneto-optical disk 81 at a predetermined rotational speed. The motor 30 rotates the magneto-optical disk 81, for example, so that the linear velocity becomes constant.

The motor drive circuit 35 drives the motor 30 by supplying a drive current to the motor 30. The motor drive circuit 35 may control the rotation of the motor 30 by pulse width modulation (PWM) or phase locked loop (PLL) control.

The laser drive circuit 155 generates a drive signal SL under the control of the control circuit 170, drives a semiconductor laser in the optical pickup by the drive signal SL, and causes a laser beam LB to be output from the semiconductor laser.

The optical pickup 150 supplies the laser beam LB to a track of the magneto-optical disk 81 and focuses it on the recording position or reproducing position of the magneto-optical disk 81.

At the time of recording, the focused portion of the magneto-optical disk 81 becomes a high temperature exceeding the Curie temperature of the recording layer, the focused portion is magnetized by the magnetic field applied by the magnetic head 20, and therefore the input signal Sin is recorded.

The amplifying circuit (head amplifier) 152 amplitudes output signals SA to SF of an optical detector in the optical pickup 150 and supplies them to the generation circuit 160.

The generation circuit 160, based on the output signals SA to SF of the optical detector from the amplifying circuit 152, generates a reproduction signal RF corresponding to the amount of light (amount of reflected light) of the reflected laser beam, a reproduction signal MO based on a magneto-optical signal, a focus error signal FE, and a tracking error signal TE.

The phase compensation circuit 40 performs compensation (phase compensation and/or frequency compensation) on the focal error signal FE and the tracking error signal TE to generate compensated signals and supplies the compensated signals to the amplifying circuit 42.

The amplifying circuit 42 amplifies the compensated signal of the focus error signal FE to generate a drive signal Sfe and supplies the same to a focusing actuator in the optical pickup 150.

Also, the amplifying circuit 42 amplifies the compensated signal of the tracking error signal TE to generate a drive signal Ste and supplies the same to the tracking actuator in the optical pickup 150.

The information detection circuit 165 receives the reproduction signal MO from the generation circuit 160, demodulates the reproduction signal MO to detect recorded information of the magneto-optical disk 81, and outputs the detected recorded signal as an output signal So.

The recording/reproduction switching circuit 175 generates a switching signal for switching between recording and reproduction of the recording and reproduction apparatus 190 and supplies the switching signal to the control circuit 170, the information detection circuit 165, the modulation circuit 10, magnetic head drive circuit 25, etc.

The modulation circuit 10 stops supplying the output signal S10 to the magnetic head drive circuit 25 when the switching signal indicating reproduction is supplied. Also, the magnetic head drive circuit 25 stops supplying the excitation current S25 to the magnetic head 20 when the switching signal indicating reproduction is supplied.

On the other hand, the information detection circuit 165 stops generating the output signal So when the switching signal indicating recording is supplied.

The control circuit 170 controls the laser output power of the optical pickup 150 in accordance with the switching signal or detects identification information and conditional information from the reproduction signal RF to control the laser output power and/or duty factor based on the conditional information and control the size of the magnetic line of force MB generated by the magnetic head 20.

Furthermore, the control circuit 170 detects an address from the reproduction signal RF and controls the recording and reproduction apparatus 190 to record information based on the detected address, identification information, and data table and to detect recorded information based on the detected address, identification information, and data table.

Figure 11:
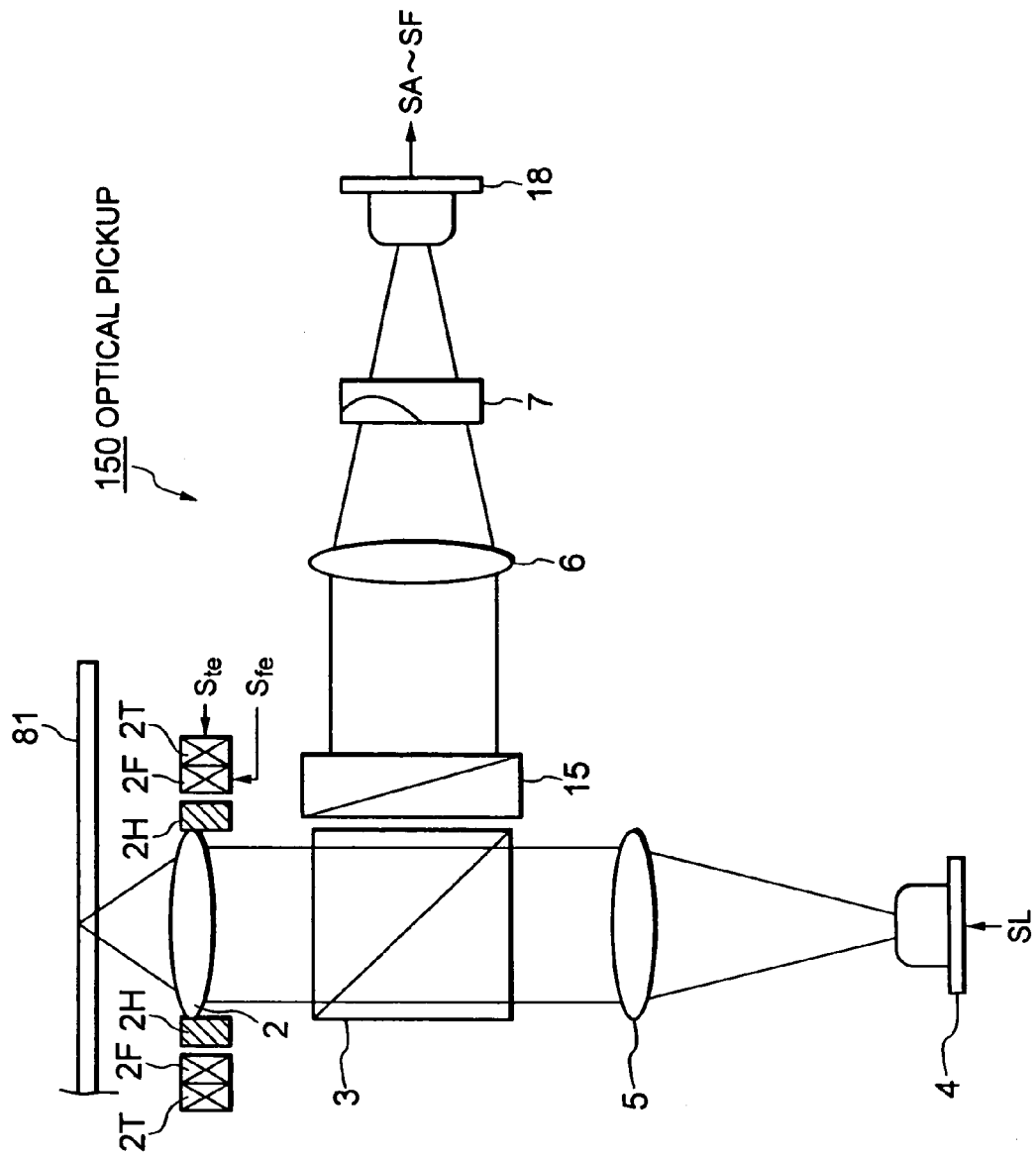
FIG. 11 is a schematic view of the configuration of an optical pickup of the recording and reproduction apparatus of FIG. 10.

FIG. 11 is a schematic view of the configuration of the optical pickup 150 included in the recording and reproduction apparatus 190.

The optical pickup 150 comprises a semiconductor laser 4, collimator lens 5, beam splitter 3, object lens 2, condenser lens 6, cylindrical lens 7, optical detector 18, lens holder 2H, focusing actuator 2F, tracking actuator 2T, and Wollaston prism 15.

The object lens 2 is held by the lens holder 2H.

The focusing actuator 2F, based on the drive signal Sfe, moves the lens holder 2H in a direction perpendicular to a recording surface of the magneto-optical disk 81 so as to move the object lens 2 in the focal direction.

The tracking actuator 2T, based on he drive signal Ste, moves the lens holder in the radial direction of the magneto-optical disk 81 so as to move the object lens 2 in the radial direction of the magneto-optical disk 81.

The semiconductor laser 4 outputs a linear polarized laser beam and supplies the same to the collimator lens 4 based on the drive signal SL.

The collimator lens 5 converts the laser beam from the semiconductor laser 4 to parallel light and supplies the same to the beam splitter 3.

The beam splitter 3 passes the laser beam from the collimator lens 5 to supply it to the object lens 2.

The object lens 2 focuses the laser beam from the beam splitter 3 and supplies it to a track of the magneto-optical disk 81 having lands and/or grooves.

Also, the object lens 2 returns the laser beam reflected on the magneto-optical disk 81 to the beam splitter 3.

The beam splitter 3 is struck by the laser beam from the object lens 2, reflects and emits the incident laser beam, and supplies it to the Wollaston prism 15.

The Wollaston prism 15 separates the laser beam from the beam splitter 3 to a main beam and first and second sub beams and supplies them to the condenser lens 6.

The condenser lens 6 condenses the laser beams from the Wollaston prism 15 and supplies them to the cylindrical lens 7.

The cylindrical lens 7 passes the laser beams from the condenser lens 6 and supplies them to the optical detector 18.

The optical detector 18 receives the laser beams from the cylindrical lens 7 at a light receiving portion and generates output signals SA to SF.

Figure 12:
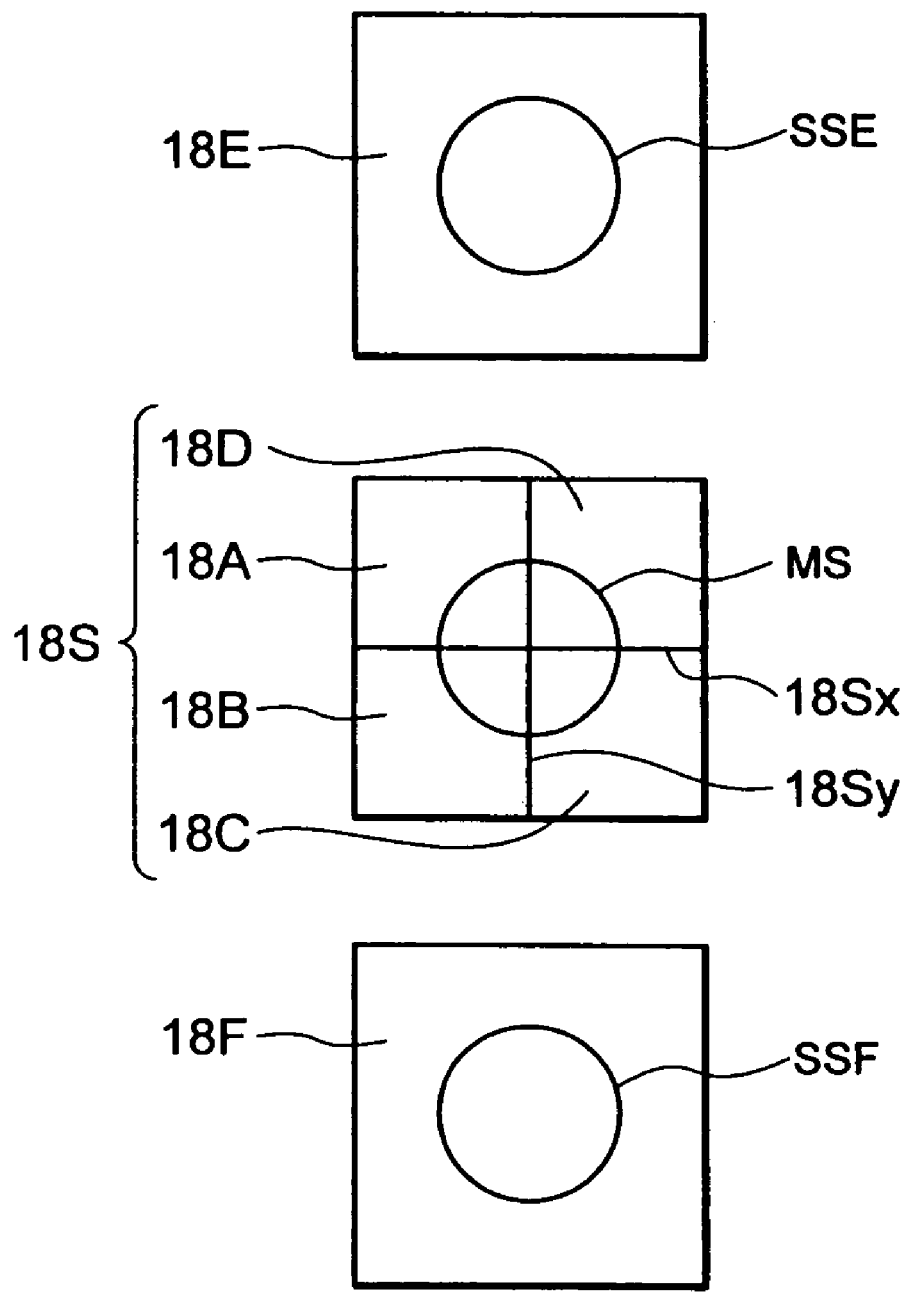
FIG. 12 is an explanatory view of the configuration of a light receiving portion of an optical detector of the optical pickup of FIG. 11.

FIG. 12 is a view for explaining the configuration of the light receiving portion of the optical detector 18. The light receiving portion of the optical detector 18 comprises a main light receiving portion 18S, a first sub light receiving portion 18E, and a second-sub light receiving portion 18F.

The main light receiving portion 18S is supplied with the main beam from the Wollaston prism 15 via the condenser lens and the cylindrical lens 7. The main light receiving portion 18S is divided into quarters by two dividing lines 18Sx and 18Sy and therefore has four divided regions 18A to 18D. At the light receiving portion 18S in FIG. 12 is formed a beam spot MS by the main beam from the cylindrical lens 7.

The symmetry axis of the cylindrical lens 7 forms an angle of about 45° or about 135° with the direction of the dividing line 18Sx or 18Sy of the main light receiving portion 18S.

The intersection of the dividing lines 18Sx and 18Sy is positioned at the center or substantial center of the main beam passed through the cylindrical lens 7.

The shape of the beam spot MS formed on the main light receiving portion 18S changes in the diagonal direction in accordance with the distance between the magneto-optical disk 81 and the object lens 2, so poor focus on the magneto-optical disk 81 can be detected by the astigmatism method based on the output signals SA to SD generated by the divided regions 18A to 18D. Also, tracking error can be detected by the push-pull method etc.

The first sub light receiving portion 18E is supplied with the first sub beam separated by the Wollaston prism 15 via the condenser lens 6 and the cylindrical lens 7 and generates an output signal SE. On the first sub light receiving portion 18E in FIG. 12 is formed a beam spot SSE by the first sub beam from the cylindrical lens 7.

The second sub light receiving portion 18F is supplied with the second sub beam separated by the Wollaston prism 15 via the condenser lens 6 and the cylindrical lens 7 and generates an output signal SF. On the sub light receiving portion 18F is formed a beam spot SSF by the second sub beam from the cylindrical lens 7.

The generation circuit 160 in the recording and reproduction apparatus 190, for example, generates a reproduction signal MO as a magneto-optical signal based on the difference of the above output signals SE and SF (SE−SF) from the amplifying circuit 152. Also, the generation circuit 160 generates a focal error signal FE using the above output signals SA to SD from the amplifying circuit 152 based on (SA+SC−SB−SD), generates a tracking error signal TE based on (SA+SD−SB−SC), and generates a reproduction signal RF in accordance with the amount of light (amount of reflected light) based on (SA+SB+SC+SD).

Note that the above embodiments were described as examples of the present invention and that the present invention is not limited to the above embodiments.

Summarizing the effects of the invention, in the above first optical recording medium, each of the plurality of zones included in the first recording area is divided into a plurality of divided areas of one type among a plurality of N number of types, each of the plurality of divided areas is assigned an address, and each has a fixed recording capacity, so the recording density and/or recording capacity can be improved by selecting a type having larger divided areas from the N number of types.

In the first recording and reproduction apparatus, by focusing a laser beam on the second recording area of the first optical recording medium to read identification information of the above one type and recording information or detecting recorded information in the first recording area based on the read identification information, it is possible to use optical recording media of a plurality of generations having different recording densities and/or recording capacities.

In the above second optical recording medium, each of the plurality of zones included in the first recording area is divided into a fixed plurality of divided areas, each of the plurality of divided areas has a recording capacity of one type among the recording capacities of M number of types, and each is assigned an address, so the recording density and/or recording capacity can be improved by selecting a type having larger divided areas from the M number of types.

In the second recording and reproduction apparatus, by focusing a laser beam on the second recording area on the second optical recording medium to read identification information of the above one type and recording information or detecting recorded information in the first recording area based on the read identification information, it is possible to use optical recording media of a plurality of generations having different recording densities and/or recording capacities.

What is claimed is:

1. An optical recording medium comprising first and second recording areas,
    said first recording area being divided into a plurality of zones;
    each of said plurality of zones being divided into a plurality of divided areas of one recording capacity among a plurality of N number of recording capacities (N is an integer more than 1) set in advance;
    said plurality of divided areas included in each of said plurality of zones being assigned addresses and having fixed recording capacities;
    identification information indicating said one recording capacity being recorded in said second recording area;
    said second recording area including records information indicating a difference in recording density from the first recording area;
    wherein said medium comprises a magneto-optical disk and
    at least one of said first and second recording areas comprises an area in which information is recorded by a magnetic field modulation recording system and recorded information is reproduced by a reproduction system using a domain wall displacement phenomenon.

* * * * *